United States Patent
Park et al.

(10) Patent No.: US 12,080,879 B1
(45) Date of Patent: Sep. 3, 2024

(54) LITHIUM SECONDARY BATTERY

(71) Applicant: LG Energy Solution, Ltd., Seoul (KR)

(72) Inventors: Seung Won Park, Daejeon (KR); Yo Han Kwon, Daejeon (KR); Je Young Kim, Daejeon (KR); Seok Koo Kim, Daejeon (KR); Wang Mo Jung, Daejeon (KR); Chul Haeng Lee, Daejeon (KR); Byung Chun Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/697,933

(22) PCT Filed: Oct. 5, 2022

(86) PCT No.: PCT/KR2022/015011
§ 371 (c)(1),
(2) Date: Apr. 2, 2024

(87) PCT Pub. No.: WO2023/059074
PCT Pub. Date: Apr. 13, 2023

(30) Foreign Application Priority Data

Oct. 5, 2021 (KR) .................. 10-2021-0131947
Oct. 5, 2022 (KR) .................. 10-2022-0127247

(51) Int. Cl.
*H01M 4/36* (2006.01)
*H01M 4/133* (2010.01)
(Continued)

(52) U.S. Cl.
CPC ........... *H01M 4/364* (2013.01); *H01M 4/133* (2013.01); *H01M 4/366* (2013.01); *H01M 4/483* (2013.01);
(Continued)

(58) Field of Classification Search
None
See application file for complete search history.

(56) References Cited

U.S. PATENT DOCUMENTS

2016/0336592 A1\* 11/2016 Hirose ............... H01M 4/5825
2020/0321615 A1 10/2020 Shin et al.
(Continued)

FOREIGN PATENT DOCUMENTS

JP 2013114882 A 6/2013
JP 2015165482 A 9/2015
(Continued)

OTHER PUBLICATIONS

International Search Report for Application No. PCT/KR2022/015011 mailed Jan. 16, 2023, pp. 1-3.

*Primary Examiner* — Wyatt P McConnell
(74) *Attorney, Agent, or Firm* — Lerner David LLP (57) ABSTRACT

A lithium secondary battery including: a negative electrode; a positive electrode; a separator disposed between the negative electrode and the positive electrode; and an electrolyte, wherein the negative electrode includes SiOx (where $0<x<2$) and a carbon-based negative electrode active material, the positive electrode includes a positive electrode active material including a lithium-rich manganese-based oxide in which a manganese content in the total metal except lithium is greater than 50 mol %, and a ratio (Li/Me) of the number of moles of lithium to a total number of moles of metals except lithium is greater than 1, and the depth of using SiOx defined by the disclosed Equation (1) in a state of SOC 0% is 1 to 15, preferably 3 to 15.

17 Claims, 2 Drawing Sheets

(51) Int. Cl.
  *H01M 4/48*       (2010.01)
  *H01M 4/505*      (2010.01)
  *H01M 4/587*      (2010.01)
  *H01M 4/62*       (2006.01)
  *H01M 10/0525*    (2010.01)
  *H01M 4/02*       (2006.01)

(52) U.S. Cl.
  CPC ........... *H01M 4/505* (2013.01); *H01M 4/587* (2013.01); *H01M 4/625* (2013.01); *H01M 10/0525* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 2021/0119200 A1 | 4/2021 | Nam |
| 2022/0029152 A1 | 1/2022 | Lee et al. |
| 2022/0255060 A1 | 8/2022 | Oh et al. |
| 2023/0078818 A1 | 3/2023 | Nam |
| 2023/0246186 A1 | 8/2023 | Shin et al. |

FOREIGN PATENT DOCUMENTS

| | | |
|---|---|---|
| JP | 2016126976 A | 7/2016 |
| JP | 2016167394 A | 9/2016 |
| JP | 6323797 B2 | 5/2018 |
| JP | 6600944 B2 | 11/2019 |
| KR | 20190129753 A | 11/2019 |
| KR | 20200107856 A | 9/2020 |
| KR | 20210016799 A | 2/2021 |
| KR | 102241465 B1 | 4/2021 |

\* cited by examiner

LITHIUM SECONDARY BATTERY

CROSS-REFERENCE TO RELATED APPLICATIONS

This application is a national phase entry under 35 U.S.C. § 371 of International Application No. PCT/KR2022/015011, filed on Oct. 5, 2022, which claims priority from Korean Patent Application No. 10-2021-0131947, filed on Oct. 5, 2021, and Korean Patent Application No. 10-2022-0127247, filed on Oct. 5, 2022, the disclosures of which are incorporated herein in its entirety by reference.

TECHNICAL FIELD

The present invention relates to a lithium secondary battery, and more specifically, to a lithium secondary battery in which a layered lithium-rich manganese-based oxide is used as a positive electrode active material and a mixture of a silicon oxide and carbon-based negative electrode active material is applied as a negative electrode active material.

BACKGROUND ART

Recently, a lithium secondary battery has been in the spotlight as an energy source for electric vehicles. As electric vehicles spread, there is an increasing demand for a lithium secondary battery that has a longer mileage per charge and can shorten quick charging time. Accordingly, there is a need to develop a lithium secondary battery having a high energy density and capable of quick charging.

A lithium secondary battery is generally prepared by a method in which, after an electrode assembly is formed by disposing a separator between a positive electrode, which includes a positive electrode active material formed of a transition metal oxide containing lithium, and a negative electrode including a negative electrode active material capable of storing lithium ions and the electrode assembly is inserted into a battery case, a non-aqueous electrolyte that becomes a medium for transferring the lithium ions is injected thereinto and the battery case is then sealed. The non-aqueous electrolyte is generally composed of a lithium salt and an organic solvent capable of dissolving the lithium salt.

Conventionally, a carbon-based material such as natural graphite or artificial graphite has been mainly used as a negative electrode active material for a lithium secondary battery. However, the carbon-based negative electrode active material has a small capacity, and thus the secondary battery to which the carbon-based negative electrode active material is applied has limitations in achieving a high capacity. Accordingly, development on a lithium secondary battery to which a silicon-based negative electrode active material having a theoretical capacity of at least 10 times more than that of a carbon-based material is applied is being attempted. The silicon-based negative electrode active material may have an advantage of achieving higher capacity than the carbon-based material, but the negative electrode may be damaged and the conductive path may be disconnected due to rapid expansion of the volume during the charging process, and thus, the battery performance is rapidly deteriorated.

Therefore, there is a need to develop a lithium secondary battery having excellent life characteristics while a silicon-based negative electrode active material is applied.

DISCLOSURE OF THE INVENTION

Technical Problem

An aspect of the present invention provides a lithium secondary battery having a high energy density and excellent life characteristics by including, as active materials, SiOx and a lithium-rich manganese-based oxide which have excellent capacity characteristics.

Technical Solution

According to an aspect of the present invention, there is provided a lithium secondary battery including: a negative electrode; a positive electrode; a separator disposed between the negative electrode and the positive electrode; and an electrolyte, wherein the negative electrode includes SiOx (where 0<x<2) and a carbon-based negative electrode active material, the positive electrode includes a positive electrode active material including a lithium-rich manganese-based oxide in which a manganese content in the total metal except lithium is greater than 50 mol %, and a ratio (Li/Me) of the number of moles of lithium to a total number of moles of metals except lithium is greater than 1, and the depth of using SiOx defined by Equation (1) below in a state of SOC 0% is 1 to 15, preferably 3 to 15.

Depth of using SiOx=(capacity of residual Li in negative electrode/capacity of SiOx in negative electrode)×100     Equation (1)

Meanwhile, the lithium-rich manganese-based oxide may be represented by Formula 1 below:

$$Li_aNi_bCO_cMn_dM_eO_2$$ [Formula 1]

In Formula 1 above, 1<a, 0≤b≤0.5, 0≤c≤0.1, 0.5≤d<1.0, and 0≤e≤0.2 may be satisfied, M may be at least one selected from the group consisting of Al, B, Co, W, Mg, V, Ti, Zn, Ga, In, Ru, Nb, Sn, Sr, and Zr, and preferably 1.1≤a≤1.5, 0.1≤b≤0.4, 0≤c≤0.05, 0.5≤d≤0.80, and 0≤e≤0.1 may be satisfied.

Meanwhile, the positive electrode active material may have a $D_{50}$ of 2 μm to 10 μm, and a BET specific surface area of 1-10 m²/g.

In addition, the positive electrode may have an initial irreversible capacity of 5% to 70%, and an electrode density of 2.5 g/cc to 3.8 g/cc.

The negative electrode may include SiOx and a carbon-based negative electrode active material in a weight ratio of 1:99 to 50:50.

The negative electrode may have a degree of prelithiation represented by Equation (2) below of 1% to 30%.

Degree of prelithiation (%)={capacity per unit area of Li intercalated into negative electrode by prelithiation/negative electrode loading amount}×100     Equation (2):

The negative electrode may further include a conductive agent and a binder, and the conductive agent may include single-walled carbon nanotubes.

The negative electrode may include a bottom negative electrode mixture layer formed on a negative electrode collector and a top negative electrode mixture layer formed on the bottom negative electrode mixture layer.

The SiOx may have a $D_{50}$ of 3 μm to 8 μm.

The SiOx may be doped with $M^b$ metals (where the $M^b$ metals denote Group 1 alkali metal atoms and/or Group 2 alkaline earth metal atoms).

The lithium secondary battery may have an N/P ratio of 100% to 150%.

Advantageous Effects

The lithium secondary battery of the present disclosure is designed such that the ratio of the residual Li capacity to the SiOx capacity in the negative electrode satisfies a specific range in a state of full discharge (SOC=0), and thus SiOx expansion is suppressed during charging and discharging, and thus the safety and life characteristics are excellent.

In addition, according to the present disclosure, a lithium-rich manganese-based oxide in which a rock-salt structure $Li_2MO_3$ phase and a layered structure $LiMO_2$ phase (where M is Ni, Co, or Mn) are mixed is used as a positive electrode active material and a silicon-based negative electrode active material is used as a negative electrode active material, and thus an excess of lithium generated from the $LiMnO_2$ phase in the activation process may compensate for an irreversible capacity of the silicon-based negative electrode active material. Thus, the use of a sacrificial positive electrode material for negative electrode compensation or the prelithiation may be minimized, thereby maximizing the positive electrode capacity.

In addition, because the lithium-rich manganese-based oxide can be stably driven even at a relatively high voltage compared to a conventional lithium nickel cobalt manganese-based oxide, when the positive electrode active material including the lithium-rich manganese-based oxide and the silicon-based negative electrode active material are used together, the driving voltage may be increased, thereby achieving a high energy density.

In addition, the lithium secondary battery of the present disclosure has excellent energy density and quick charging performance because the lithium secondary battery includes a silicon-based negative electrode active material having excellent capacity and rate characteristics as a negative electrode active material.

BEST MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

As used herein, the term "primary particle" refers to a particle unit in which an external grain boundary does not exist when observed in the view at a magnification of 5,000 to 20,000 using a scanning electron microscope. The term "average particle diameter of the primary particles" refers to an arithmetic mean value of the particle diameters calculated by measuring the particle diameters of the primary particles observed in the scanning electron microscope image.

As used herein, the term "secondary particle" is a particle formed by the aggregation of a plurality of primary particles.

As used herein, the term "average particle diameter $D_{50}$" refers to a particle size based on 50% of the volume cumulative particle size distribution of particle powder to be measured (e.g., positive electrode active material powder, negative electrode active material powder, etc.). The average particle diameter $D_{50}$ may be measured using a laser diffraction method. For example, powder of particles to be measured may be dispersed in a dispersion medium, then introduced into a commercially available laser diffraction particle size measuring apparatus (e.g., Microtrac MT 3000), irradiated with an ultrasonic wave of about 28 kHz at a 60-W output, and then a volume cumulative particle size distribution graph may be obtained, and a particle size corresponding to 50% of the volume cumulative amount may be determined to measure the average particle diameter $D_{50}$.

As used herein, the term "N/P ratio" refers to a percentage of the negative electrode loading amount to the positive electrode loading amount, that is, (negative electrode loading amount/positive electrode loading amount)×100.

As used herein, the term "positive electrode loading amount" refers to a discharge capacity per unit area of the positive electrode (unit: $mAh/cm^2$), and the term "negative electrode loading amount" refers to a discharge capacity per unit area of a negative electrode (unit: $mAh/cm^2$).

Hereinafter, the present invention will be described in detail.

As a result of a significant amount of research conducted for developing a lithium secondary battery having both excellent energy density and life characteristics, the present inventors have found that a battery can be achieved with high energy density and excellent life characteristics by applying, as active materials, a lithium-rich manganese-based oxide and SiOx having excellent capacity characteristics and designing the battery such that the depth of using SiOx satisfies a specific range in a state of full discharge (SOC=0)

The lithium secondary battery according to the present disclosure includes: a negative electrode; a positive electrode; a separator disposed between the negative electrode and the positive electrode; and an electrolyte, wherein the negative electrode includes, as negative electrode active materials, SiOx (where 0<x<2) and a carbon-based negative electrode active material, the positive electrode includes, as a positive electrode active material, a lithium-rich manganese-based oxide in which a manganese content in the total metal except lithium is greater than 50 mol % and a ratio (Li/Me) of the number of moles of lithium to a total number of moles of metals except lithium is greater than 1, and the depth of using SiOx defined by Equation (1) below in a state of SOC 0% satisfies 1 to 15.

Depth of using SiOx (%)=(capacity of residual Li in negative electrode/capacity of SiOx in negative electrode)×100    Equation (1):

Hereinafter, each component of the lithium secondary battery according to the present invention will be described in detail.

Negative Electrode

The negative electrode according to the present disclosure includes, as negative electrode active materials, a silicon oxide (i.e., SiOx (0<x<2)) and a carbon-based negative electrode active material. For example, the negative electrode according to the present disclosure includes a negative electrode collector and a negative electrode active material layer formed on at least one surface of the negative electrode collector, and the negative electrode active material layer includes, as negative electrode active materials, SiOx (0<x<2) and a carbon-based negative electrode active material.

Because SiOx (0<x<2) has a higher theoretical capacity and a faster reaction rate with lithium than the carbon-based negative electrode active material, when SiOx is included as a negative electrode active material, energy density and quick charging performance are improved. However, SiOx has a large irreversible capacity and a large volume expansion during charging and discharging, and thus shows an inferiority in terms of life characteristics. In particular, when SiOx is used in combination with a lithium-rich manganese-based oxide in which an oxygen-redox reaction occurs, there is a limitation in that the deterioration of life characteristics is further intensified. In addition, when SiOx and a carbon-based negative electrode active material are mixed and used, there is a limitation in that non-uniformity occurs in the negative electrode due to a difference in reaction speed between the silicon-based negative electrode active material and the carbon-based negative electrode active material, and thus the deterioration of the negative electrode occurs.

In the present technology, in order to solve the above-described limitations, the depth of using SiOx in the negative electrode is adjusted to a specific range so that it is possible to minimize volume expansion and reaction non-uniformity between the negative electrode active materials during charging and discharging.

Specifically, in the lithium secondary battery according to the present disclosure, the depth of using SiOx defined by Equation (1) below in SOC 0%, that is, in a state of full discharge may be 1% to 15%, preferably 3% to 15%, and more preferably 5% to 15%.

Depth of using SiOx (%)=(capacity of residual Li in negative electrode/capacity of SiOx in negative electrode)×100    Equation (1):

According to the study of the present inventors, when the depth of using SiOx is less than 1% or greater than 15% in a state of SOC 0% (i.e., a state of full discharge), the life characteristics are rapidly deteriorated. Specifically, when the depth of using SiOx in a state of full discharge is less than 1%, changes in the volume of SiOx occur rapidly during a charging and discharging process, resulting in the deterioration of energy density and life characteristics, and when the depth of using SiOx in a state of full discharge is greater than 15%, the electrical connectivity of the electrode deteriorates, resulting in the deterioration of life characteristics.

The depth of using SiOx may be affected by a combination of a ratio of the negative electrode loading amount to the positive electrode loading amount (N/P ratio), composition of the negative electrode active material, composition of the positive electrode active material, a degree of prelithiation of the negative electrode, activation conditions, and the like, and the depth of using SiOx may be controlled by appropriately controlling these factors.

Meanwhile, the capacity of residual Li in the negative electrode and the capacity of SiOx in the negative electrode in a state of SOC 0% may be measured by the following method.

First, the lithium secondary battery is fully discharged, and then disassembled to separate the negative electrode. Then, a coin half-cell is manufactured using the separated negative electrode and a Li metal counter electrode, and then delithiated to 1.0 V at 0.1 C to measure a discharge capacity. In this case, the measured discharge capacity is a capacity expressed by the residual Li in the negative electrode, and thus can be evaluated as the capacity of residual Li in the negative electrode.

Next, the capacity of SiOx in the negative electrode can be calculated by obtaining a voltage-capacity graph while charging and discharging the coin half-cell in a voltage range of 0.005 V to 1.0 V at 0.1 C, and then using the voltage-capacity graph.

Specifically, the SiOx capacity in the negative electrode can be calculated by the following method.

When the voltage-capacity graph of the coin half-cell manufactured using the negative electrode including the carbon-based negative electrode active material and SiOx is measured, a slope of the voltage-capacity graph is rapidly changed in the vicinity of 0.25 V, and a capacity achieved at a voltage equal to or lower than a voltage (e.g., 0.25 V) at the point at which the slope is rapidly changed is a capacity resulting from the carbon-based negative electrode active material, and a capacity achieved at a voltage equal to or higher than a voltage (e.g., 0.25 V) at the point at which the slope is rapidly changed is a capacity resulting from the SiOx. Therefore, when the capacity at the point at which the slope is rapidly changed in the capacity-voltage graph of the coin half-cell is A and the total discharge capacity of the coin half-cell is B, the capacity of SiOx in the negative electrode may be calculated by B-A.

Meanwhile, the SiOx may be doped with $M^b$ metals, as necessary. In this case, the $M^b$ metals may be Group 1 alkali metal elements and/or Group 2 alkaline earth metal elements, for example, Li, Mg, or the like. $M^b$ metal-doped SiOx may achieve a high energy density because the active material capacity is deteriorated due to the doping element but has high efficiency.

In addition, the SiOx may further include a carbon coating layer on the surface of particles, as necessary. In this case, the carbon coating amount may be 20 wt % or less, preferably 0.1-20 wt % based on the total weight of the SiOx active material. When the carbon coating is applied, the electrical conductivity of the surface of SiOx is improved, so that the uniformity of the SEI layer is improved and an effect of improving the initial efficiency and life characteristics may be obtained. In this case, the carbon coating layer may be formed by a method such as dry coating, wet coating, chemical vapor deposition (CVD), physical vapor deposition (PVD), or atomic layer deposition (ALD).

Meanwhile, it is preferable that the SiOx has a capacity of 1,000-4,000 mAh/g, preferably 1,000-3,800 mAh/g, and more preferably 1,200-3,800 mAh/g. When SiOx that satisfies the above capacity range is used, high capacity characteristics may be achieved.

In addition, the SiOx may have an initial efficiency of 60% to 95%, 70% to 95%, and preferably 75% to 95%. In this case, the initial efficiency of the SiOx means the percentage of the discharge capacity to the charge capacity measured by manufacturing a half-cell with a negative electrode using SiOx as a negative electrode active material in an amount of 100% and a Li metal counter electrode, and then charging and discharging the half-cell in a voltage range of 0.01 V to 1.5 V at 0.1C-rate. When the initial efficiency of the SiOx satisfies the above range, lithium provided from the positive electrode may be reversibly used, and excellent quick charging performance may be achieved.

In addition, the SiOx may have an average particle diameter $D_{50}$ of 3 μm to 8 μm, preferably 4 μm to 7 μm, and Dmin to Dmax may be 0.01 μm to 30 μm, preferably 0.01 μm to 20 μm, and more preferably 0.5 μm to 15 μm. When the particle size of the SiOx satisfies the above range, a sufficient electrode density may be secured when the SiOx is mixed with the carbon-based negative electrode active material.

Meanwhile, as the carbon-based negative electrode active material, various carbon-based negative electrode active materials used in the art, for example, artificial graphite, natural graphite, graphitized carbon fiber, amorphous carbon, soft carbon, hard carbon, or a combination thereof may be used. Preferably, artificial graphite, natural graphite, or a combination thereof may be used.

The carbon-based negative electrode active material may have an average particle diameter $D_{50}$ of 2 μm to 30 μm, preferably 5 μm to 30 μm. When the particle diameter of the carbon-based negative electrode active material satisfies the above range, a sufficient electrode density can be secured when the carbon-based negative electrode active material is mixed with SiOx.

Meanwhile, the SiOx and the carbon-based negative electrode active material may be included in the negative electrode at a weight ratio of 1:99 to 50:50, preferably 3:97 to 50:50, more preferably 5:95 to 50:50, and still more preferably 5:95 to 30:70 (SiOx:carbon-based negative electrode active material). When the mixed ratio of the SiOx and the carbon-based negative electrode active material satisfies the above range, a secondary battery having excellent energy density, life characteristics, and quick charging performance may be achieved. If the ratio of SiOx is too low, the effect of improving the energy density and quick charging performance is insignificant, and if the ratio of SiOx is too high, the life characteristics may deteriorate.

Meanwhile, the negative electrode active material layer may further include a conductive agent and a binder, as necessary.

The conductive agent may include, for example, spherical or flaky graphite; carbon-based materials such as carbon black, acetylene black, Ketjen black, channel black, furnace black, lamp black, thermal black, carbon fibers, single-walled carbon nanotubes, and multi-walled carbon nanotubes; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one alone thereof or a mixture of two or more thereof may be used. The conductive agent may be included in an amount of 0.1-30 wt %, 0.1-20 wt %, or 0.1-10 wt % based on the total weight of the negative electrode active material layer.

Preferably, as the conductive agent, single-walled carbon nanotubes may be used. When the single-walled carbon nanotubes are used as a conductive agent, a wide conductive path is formed, thereby obtaining effects of increasing durability and reducing resistance, and accordingly, excellent life characteristics may be achieved.

Figure 1:
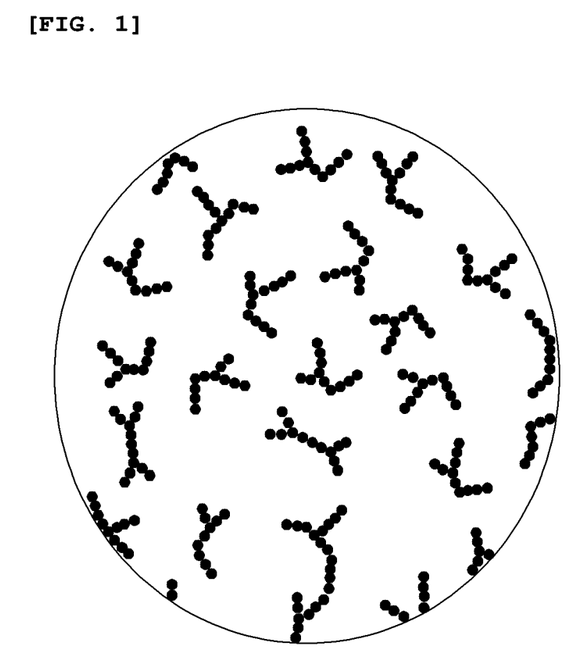
FIG. 1 is an image showing the formation of a conductive path on the surface of a negative electrode active material when single-walled carbon nanotubes are used as a conductive agent.
Figure 2:
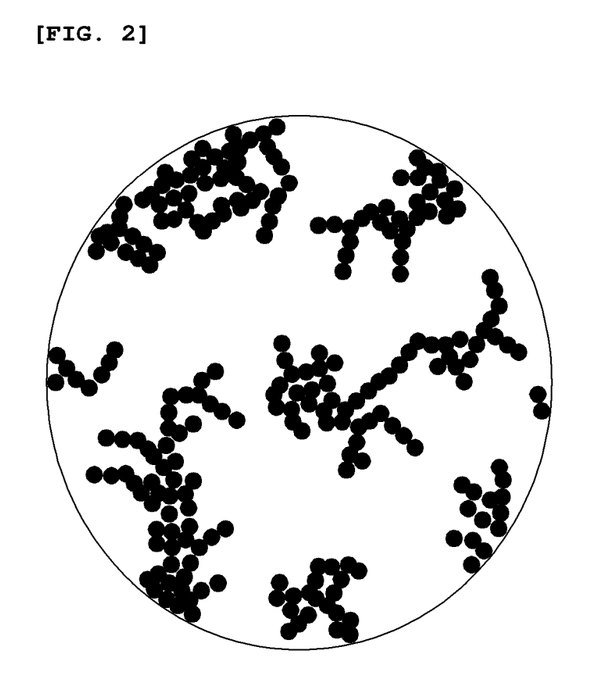
FIG. 2 is an image showing the formation of a conductive path on the surface of a negative electrode active material when multi-walled carbon nanotubes are used as a conductive agent.

FIG. 1 shows an image showing the formation of a conductive path on the surface of a negative electrode active material when single-walled carbon nanotubes are used as a conductive agent, and FIG. 2 shows an image showing the formation of a conductive path on the surface of a negative electrode active material when multi-walled carbon nanotubes are used as a conductive agent.

As shown in FIGS. 1 and 2, when the single-walled carbon nanotubes are used as a conductive agent, a conductive path is uniformly formed on the surface of the negative electrode active material, thereby obtaining an effect of improving cycle characteristics.

In addition, the binder may include, for example, polyvinylidene fluoride (PVDF), polyvinylidene fluoride-hexafluoropropylene copolymer (PVDF-co-HFP), polyvinyl alcohol, polyacrylic acid, polyacrylamide, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer rubber (EPDM rubber), a sulfonated EPDM, a styrene-butadiene rubber (SBR), a fluorine rubber, or various copolymers thereof, and any one alone thereof or a mixture of two or more thereof may be used. The binder may be included in an amount of 1-20 wt %, 2-20 wt %, or 2-10 wt % based on the total weight of the negative electrode active material layer.

Meanwhile, the negative electrode may have a negative electrode active material layer in a single-layered structure or a multi-layered structure composed of two or more layers. For example, the negative electrode may include a first negative electrode active material layer formed on the negative electrode collector and a second negative electrode active material layer formed on the first negative electrode active material.

When the negative electrode active material layer has a multi-layered structure composed of two or more layers, each of the layers may have different types and/or amounts of the negative electrode active material, the binder, and/or the conductive agent.

For example, the first negative electrode active material layer (bottom layer) may have the amount of the carbon-based negative electrode active material in the total negative electrode active material higher than the second negative electrode active material layer (top layer), the second negative electrode active material layer may have the amount of the silicon-based negative electrode active material in the total negative electrode active material higher than the first negative electrode active material layer, or the second negative electrode active material layer (top layer) may have the amount of the conductive agent higher than the first negative electrode active material layer (bottom layer).

By forming the negative electrode active material layer in a multi-layered structure as described above and varying the composition of each layer, performance characteristics of the battery may be improved. For example, when the amount of the conductive agent or the silicon-based negative electrode active material in the top layer is higher than that of the bottom layer, an effect of improving quick charging performance may be obtained.

Meanwhile, in the present disclosure, the negative electrode may be a negative electrode that has been subjected to prelithiation, as necessary.

The prelithiation of the negative electrode may be performed by, for example, a method of compressing or depositing lithium metals on a negative electrode active material layer, a method of intercalating lithium into the negative electrode active material layer through an electrochemical method, a method of intercalating, into the negative electrode, excess lithium included in a sacrificial positive electrode material included in the positive electrode through an activation process, or a method of giving excess lithium to the positive electrode by an electrochemical method, a method of compressing or depositing lithium metals, and intercalating, into the negative electrode, excess lithium given to the positive electrode through the activation process, or the like, and may be performed by combining two or more of the above methods.

When the above-described prelithiation process is performed, the depth of using SiOx in a state of full discharge may be adjusted by adjusting the degree of prelithiation, and the depth of using SiOx satisfying the scope of the present disclosure may be achieved even when the SiOx content in the negative electrode is high compared to the case where the prelithiation is not performed. Because the energy density increases when the SiOx content in the negative electrode increases, when the prelithiated negative electrode is used, a higher energy density may be achieved than when the non-prelithiated negative electrode is used. That is, when the prelithiated negative electrode is applied, the depth of using SiOx may be adjusted to the scope of the present disclosure while increasing the SiOx content in the negative electrode, thereby further improving the energy density and life characteristics.

Preferably, the negative electrode of the present disclosure may have a degree of prelithiation, represented by Equation (2) below, of 1% to 30%, preferably 1% to 20%, and more preferably 3% to 20%.

Degree of prelithiation (%)={capacity per unit area of Li intercalated into negative electrode by prelithiation/negative electrode loading amount}×100          Equation (2):

When the degree of prelithiation of the negative electrode satisfies the above range, a lithium secondary battery having excellent energy and life characteristics may be achieved.

Meanwhile, the negative electrode active material layer may have a porosity of 20% to 70% or 20% to 50%. If the porosity of the negative electrode active material layer is too small, electrolyte solution wetting may deteriorate and thus lithium mobility may deteriorate, and if the porosity is too large, the energy density may deteriorate.

Positive Electrode

The positive electrode according to the present disclosure includes, as a positive electrode active material, a lithium-rich manganese-based oxide in which a manganese content in the total metal except lithium is greater than 50 mol % and a ratio (Li/Me) of the number of moles of lithium to a total number of moles of metals except lithium is greater than 1. Specifically, the positive electrode of the present disclosure includes a positive electrode collector, and a positive electrode active material layer formed on at least one surface of the positive electrode collector, and the positive electrode active material layer includes a lithium-rich manganese-based oxide in which a manganese content in the total metal except lithium is greater than 50 mol % and a ratio (Li/Me) of the number of moles of lithium to a total number of moles of metals except lithium is greater than 1.

The lithium-rich manganese-based oxide containing lithium in excess has a structure in which a layered phase (LiM'O2) and a rock-salt phase ($Li_2MnO_3$) are mixed, the rock-salt phase is activated in the initial activation process, and thus an excess of lithium ions is generated, thereby achieving a high capacity. In addition, because the negative electrode irreversible capacity may be compensated by lithium ions generated in the activation process, it is not necessary to add a separate compensation material such as a sacrificial positive electrode material, thereby increasing the positive electrode capacity.

Preferably, the lithium-rich manganese-based oxide may be represented by Formula 1.

$Li_aNi_bCo_cMn_dM_eO_2$          [Formula 1]

In Formula 1 above, M may be at least one selected from the group consisting of Al, B, Co, W, Mg, V, Ti, Zn, Ga, In, Ru, Nb, Sn, Sr, and Zr.

Meanwhile, a represents a molar ratio of lithium in the lithium-rich manganese-based oxide, and may satisfy 1<a, 1.1≤a≤1.5, or 1.1≤a≤1.3. When a satisfies the above range, the irreversible capacity of SiOx may be sufficiently compensated, high capacity characteristics may be achieved.

b above represents a molar ratio of Ni in the lithium-rich manganese-based oxide, and may satisfy 0≤b≤0.5, 0.1≤b≤0.4, or 0.2≤b≤0.4.

c above represents a molar ratio of Co in the lithium-rich manganese-based oxide, and may satisfy 0≤c≤0.1, 0≤c≤0.08, or 0≤c≤0.05. When c is greater than 0.1, it is difficult to secure a high capacity, and gas generation and deterioration of the positive electrode active material may be intensified, resulting in the deterioration of life characteristics.

d above represents a molar ratio of Mn in lithium-rich manganese-based oxide, and may satisfy 0.5≤d<1.0, 0.50≤d≤0.80, or 0.50≤d≤0.70. When d is less than 0.5, the ratio of the rock-salt phase becomes too small, and the effects of irreversible compensation for the negative electrode and capacity improvement are insignificant.

e above represents a molar ratio of doping element M in the lithium-rich manganese-based oxide, and e may satisfy 0≤e≤0.2, 0≤e≤0.1, or 0≤e≤0.05. If the doping element content is too large, it may adversely affect the active material capacity.

Meanwhile, in the lithium-rich manganese-based oxide represented by Formula 1 above, a ratio (Li/Me) of the number of moles of Li to a total number of moles of metals except Li may be 1.2-1.5, 1.25-1.5, or 1.25-1.4. When the Li/Me ratio satisfies the above range, excellent rate characteristics and capacity characteristics are exhibited. If the Li/Me ratio is too high, electrical conductivity may decrease, and the rate of deterioration may increase due to the increase of the rock-salt phase ($Li_2MnO_3$), and if the ratio is too low, the effect of improving the energy density is insignificant.

Meanwhile, the composition of the lithium-rich manganese-based oxide may be represented by Formula 2 below:

X $Li_2MnO_3$·(1-X)Li[$Ni_{1-y-z-w}Mn_yCo_zM_w$]$O_2$          [Formula 2]

In Formula 2 above, M may be at least one selected from the group consisting of metal ions, Al, B, Co, W, Mg, V, Ti, Zn, Ga, In, Ru, Nb, Sn, Sr, and Zr.

X above represents a ratio of $Li_2MnO_3$ phase in the lithium-rich manganese-based oxide, and may satisfy 0.2≤X≤0.5, 0.25≤X≤0.5, or 0.25≤X≤0.4. When the ratio of $Li_2MnO_3$ phase in the lithium-rich manganese-based oxide satisfies the above range, the irreversible capacity of the SiOx negative electrode active material may be sufficiently compensated, and high capacity characteristics may be achieved.

y above represents a molar ratio of Mn in the LiM'O2 layer phase, and may satisfy 0.4≤y<1, 0.4≤y≤0.8, or 0.4≤y≤0.7.

z above represents a molar ratio of Co in the LiM'O2 layer phase, and may satisfy 0≤z≤0.1, 0≤z≤0.08, or 0≤z≤0.05. When z is greater than 0.1, gas generation and deterioration of the positive electrode active material may be intensified, resulting in the deterioration of life characteristics.

w above represents a molar ratio of doping element M in the LiM'O2 layer phase, and may satisfy 0≤w≤0.2, 0≤w≤0.1, or 0≤w≤0.05.

Meanwhile, the positive electrode active material according to the present disclosure may further include a coating layer on the surface of the lithium-rich manganese-based oxide, as necessary. When the positive electrode active material includes the coating layer, the contact between the lithium-rich manganese-based oxide and the electrolyte is suppressed by the coating layer, thereby reducing side reactions of the electrolyte solution, and thus an effect of improving life characteristics may be obtained.

The coating layer may include a coating element $M^1$, and the coating element $M^1$ may be, for example, at least one selected from the group consisting of Al, B, Co, W, Mg, V, Ti, Zn, Ga, In, Ru, Nb, Sn, Sr, and Zr, preferably Al, Co, Nb, W, and a combination thereof, and more preferably Al, Co, and a combination thereof. The coating element M' may include at least two, and may include, for example, Al and Co.

The coating element may exist in an oxide form in the coating layer, that is, M'Oz (1≤z≤4).

The coating layer may be formed by a method such as dry coating, wet coating, chemical vapor deposition (CVD), physical vapor deposition (PVD), or atomic layer deposition (ALD). Among these, the coating layer is preferably formed through the atomic layer deposition method in that the area of the coating layer can be wide.

The area of the coating layer may be 10% to 100%, preferably 30% to 100%, and more preferably 50% to 100%, based on the total surface area of the lithium-rich manganese-based oxide particles. When the area of the coating layer satisfies the above range, the effect of improving life characteristics is excellent.

Meanwhile, the positive electrode active material according to the present disclosure may be in the form of secondary particles in which a plurality of primary particles are aggregated, and the average particle diameter $D_{50}$ of the secondary particles may be 2 μm to 10 μm, preferably 2 μm to 8 μm, and more preferably 4 μm to 8 μm. When the $D_{50}$ of the positive electrode active material satisfies the above range, an excellent electrode density may be achieved, and deterioration in capacity and rate characteristics may be minimized.

In addition, the positive electrode active material may have a BET specific surface area of 1 $m^2/g$ to 10 $m^2/g$, 3 $m^2/g$ to 8 $m^2/g$, or 4 $m^2/g$ to 6 $m^2/g$. If the BET specific surface area of the positive electrode active material is too low, the reaction area with the electrolyte is insufficient, and thus it is difficult to achieve sufficient capacity, and if the specific surface area is too high, moisture absorption is fast, and the side reaction with the electrolyte is accelerated, thereby making it difficult to secure life characteristics.

In addition, the positive electrode according to the present disclosure preferably has an initial irreversible capacity of about 5% to about 70%, about 5% to about 50%, or about 5% to about 30%. The initial irreversible capacity of the positive electrode is a percentage of the discharge capacity, a measured value based on 0.1 C, when a half-cell is manufactured with the positive electrode and a lithium counter electrode, and then the half-cell is charged and discharged in a voltage range of 2.5 V to 4.4 V with respect to the charging capacity when the half-cell is charged at a high voltage of at least 4.6 V. When the initial irreversible capacity of the positive electrode satisfies the above range, the irreversible capacity of the silicon-based negative electrode active material may be sufficiently compensated without using a separate compensation material such as a sacrificial positive electrode material.

Meanwhile, the lithium-rich manganese-based oxide may be prepared by mixing a transition metal precursor and a lithium raw material and then sintering the mixture.

Examples of the lithium raw material may include a lithium-containing carbonate (e.g., lithium carbonate, etc.), a hydrate (e.g., lithium hydroxide hydrate ($LiOH-H_2O$), etc.), a hydroxide (e.g., lithium hydroxide, etc.), a nitrate (e.g., lithium nitrate ($LiNO_3$), etc.), a chloride (e.g., lithium chloride (LiCl), etc.), etc., and any one alone thereof or a mixture of two or more thereof may be used.

Meanwhile, the transition metal precursor may be in the form of a hydroxide, an oxide, or a carbonate. When a precursor in the form of carbonate is used, it is more preferable in that it is possible to prepare a positive electrode active material having a relatively high specific surface area.

The transition metal precursor may be prepared by a co-precipitation process. For example, the transition metal precursor may be prepared by dissolving each transition metal-containing raw material in a solvent to prepare a metal solution, then mixing the metal solution, an ammonium cation complex forming agent, and a basic compound, and then performing a co-precipitation reaction. In addition, as necessary, an oxidizing agent or oxygen gas may be further added during the co-precipitation reaction.

In this case, the transition metal-containing raw material may be an acetate, a carbonate, a nitrate, a sulfate, a halide, a sulfide, etc. of each transition metal.

Specifically, the transition metal-containing raw material may be NiO, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, $Mn_2O_3$, $MnO_2$, $Mn_3O_4MnCO_3$, $Mn(NO_3)_2$, $MnSO_4 \cdot H_2O$, manganese acetate, manganese halide, etc.

The ammonium cation complex forming agent may be at least one selected from the group consisting of $NH_4OH$, $(NH_4)_2SO_4$, $NH_4NO_3$, $NH_4Cl$, $CH_3COONH_4$, and $NH_4CO_3$.

The basic compound may be at least one selected from the group consisting of NaOH, $Na_2CO_3$, KOH, and $Ca(OH)_2$. The form of the precursor may vary with the type of a basic compound to be used. For example, when NaOH is used as the basic compound, a precursor in the form of a hydroxide may be obtained, and when $Na_2CO_3$ is used as the basic compound, a precursor in the form of a carbonate may be obtained. In addition, when a basic compound and an oxidizing agent are used together, a precursor in the form of an oxide may be obtained.

Meanwhile, the transition metal precursor and the lithium raw material may be mixed in an amount such that the molar ratio of the total transition metal (Ni+Co+Mn):Li is 1:1.05 to 1:2, preferably 1:1.1 to 1:1.8, and more preferably 1:1.25 to 1:1.8.

Meanwhile, the sintering may be performed at 600° C. to 1,000° C. or 700° C. to 950° C., and the sintering time may be 5 hours to 30 hours or 5 hours to 20 hours. In addition, the sintering atmosphere may be an air atmosphere or an oxygen atmosphere, and for example, may be an atmosphere including oxygen in an amount of 20% to 100% by volume.

Meanwhile, the positive electrode active material layer may further include a conductive agent and a binder in addition to the positive electrode active material.

The conductive agent may include, for example, spherical or flaky graphite; carbon-based materials such as carbon black, acetylene black, Ketjen black, channel black, furnace black, lamp black, thermal black, carbon fibers, single-walled carbon nanotubes, and multi-walled carbon nanotubes; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one alone thereof or a mixture of two or more thereof may be used. The conductive agent may be included in an amount of 0.1-20 wt %, 1-20 wt %, or 1-10 wt % based on the total weight of the positive electrode active material layer.

In addition, the binder may include, for example, polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer rubber (EPDM rubber), a sulfonated EPDM, a styrene-butadiene rubber (SBR), a fluorine rubber, or various copolymers thereof, and any one alone thereof or a mixture of two or more thereof may be used. The binder may be included in an amount of 1-20 wt %, 2-20 wt %, or 2-10 wt % based on the total weight of the positive electrode active material layer.

Meanwhile, the positive electrode according to the present disclosure may have an electrode density of about 2.5 g/cc to about 3.8 g/cc, about 2.5 g/cc to about 3.5 g/cc, or about 3.0 g/cc to about 3.3 g/cc. When the electrode density of the positive electrode satisfies the above range, high energy density may be achieved.

As described above, the lithium secondary battery of the present disclosure, to which the lithium-rich manganese-based oxide represented by Formula 1 is applied as the positive electrode active material, can stably operate the cell even when the charge end voltage is set to a level of 4.3 V to 4.5 V when the battery is driven, thereby achieving high capacity characteristics.

Separator

In the lithium secondary battery of the present disclosure, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be preferred. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single-layered or multi-layered structure may be optionally used.

Electrolyte

Also, the electrolyte used in the present disclosure may include an organic liquid electrolyte, an inorganic liquid electrolyte, a solid polymer electrolyte, a gel-type polymer electrolyte, a solid inorganic electrolyte, or a molten-type inorganic electrolyte which may be used in the manufacture of the lithium secondary battery, but is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methyl ethyl carbonate (MEC), ethyl methyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent.

Any compound may be used as the lithium salt without particular limitation as long as it may provide lithium ions used in a lithium secondary battery. Specifically, anions of the lithium salt may be at least one selected from the group consisting of $F^-$, $Cl^-$, $Br^-$, $I^-$, $NO_3^-$, $N(CN)_2^-$, $BF_4^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$, and as the lithium salt, $LiPF_6$, $LiN(FSO_2)_2$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. It is preferable to use the lithium salt in a concentration range of 0.1 M to 5.0 M.

In addition, the electrolyte may contain an additive for the purpose of improving the life characteristics of the battery, suppressing a decrease in capacity, suppressing gas generation, and the like. As the additive, various additives used in the art, for example, fluoroethylene carbonate (FEC), vinylene carbonate (VC), vinylethylene carbonate (VEC), ethylene sulfate (ESa), lithium difluorophosphate ($LiPO2F_2$), lithium bisoxalato borate (LiBOB), lithium tetrafluoroborate (LiBF4), lithium difluorooxalato borate (LiDFOB), lithium difluorooxalato phosphate (LiDFBP), lithium tetrafluorooxalato phosphate (LiTFOP), lithium methylsulfate (LiMS), lithium ethylsulfate (LiES) propane sultone (PS), propene sultone (PRS), succinonitrile (SN), adiponitrile (AND), 1,3,6-hexanetricarbonitrile (HTCN), 1,4-dicyano-2-butene (DCB), fluorobenzene (FB), ethyldi(prop-2-yn-1-yl)phosphate (EDP), 5-methyl-5-propargyloxycarbonyl-1,3-dioxane-2-one (MPOD), a compound represented by Formula A below (e.g., cyanoethylpolyvinyl alcohol, PVA-CN), a compound represented by Formula B below (e.g., heptafluorobutyl cyanoethylpolyvinyl alcohol, PF-PVA-CN), a compound represented by Formula C below (e.g., propargyl 1H-imidazole-1-carboxylate, PAC), and/or a compound represented by Formula D below (e.g., arylimidazole such as $C_6H_8N_2$) may be used.

[Formula A]

In Formula A above, n and m are each independently an integer of 1-100.

[Formula B]

[Formula C]

In Formula C above, $R_{16}$ is a linear or non-linear alkylene having 1 to 3 carbon atoms, $R_{17}$ to $R_{19}$ are each independently at least one selected from the group consisting of hydrogen, an alkyl group having 1 to 3 carbon atoms, and a cyano group (—CN), and D is CH or N.

[Formula D]

In Formula D above,

$R_1$, $R_2$, $R_3$, and $R_4$ may each independently include hydrogen, an alkyl group having 1 to 5 carbon atoms, a cyano group (CN), an allyl group, a propargyl group, an amine group, a phosphate group, an ether group, a benzene group, a cyclohexyl group, a silyl group, an isocyanate group (—NCO), or a fluoro group (—F).

Preferably, compounds that act as an oxygen scavenger may be used as the additive. For example, a material (see Formula E) having a phosphite-based structure such as tris (trimethylsilyl)phosphite (TMSPi), trimethylphosphite (TMPi), tris(2,2,2-trifluoroethyl)phosphite (TTFP); tris (trimethylsilyl)phosphate (TMSPa); polyphosphoric acid trimethylsilyl ester (PPSE); tris(pentaflorophenyl)borane (TPFPB); a compound containing a coumarin structure (see Formula F) such as coumarin-3-carbonitrile (CMCN), 7-ethynylcoumarin (ECM), 3-acetylcoumarin (AcCM), 3-(trimethylsilyl)coumarin (TSCM), and the like (see Chemical Formula F); 3-[(trimethylsilyl)oxyl]-2H-1-benzopyran-2-one (TMSOCM), 3-(2-propyn-1-yloxyl)-2H-1-benzopyran-2-one (OBCM), or the like may be used as a compound that acts as an oxygen scavenger.

[Formula E]

[Formula F]

In Formulae E and F, $R_1$-$R_6$ may be each independently a substituted or unsubstituted alkenyl group having 2 to 20 carbon atoms and a substituted or unsubstituted alkynyl group having 2 to 20 carbon atoms, and may contain a cyano group (—CN), a fluoro group (—F), an ether group (C—O—C), a carboxyl group (O—C=O), a trimethylsilyl group (-TMS), an isocyanate group (—NCO), and/or an isothiocyanate group (—NCS).

Meanwhile, the lithium secondary battery according to the present disclosure may have an N/P ratio of 100% to 150%, preferably 105% to 130%, and more preferably 105% to 120%. When the N/P ratio is less than the above range, lithium precipitation may occur in the negative electrode when the ratio is less than 100%, and when the ratio is greater than 150%, it is difficult to achieve the depth of using SiOx within the scope of the present disclosure.

Meanwhile, the lithium secondary battery according to the present disclosure includes the SiOx, thereby achieving excellent energy density and quick charging performance, and exhibiting excellent life characteristics. Specifically, the lithium secondary battery according to the present disclosure may have the number of cycles of reaching 80% life of at least 510, preferably at least 530, and more preferably at least 550, and may have an energy density of at least 460 Wh/L, preferably at least 470 Wh/L, and more preferably at least 480 Wh/L.

MODE FOR CARRYING OUT THE INVENTION

Hereinafter, the present invention will be described in more detail with reference to specific examples.

Example 1

<Manufacture of Positive Electrode>

A positive electrode active material, a conductive agent, and a PVDF binder were mixed in a weight ratio of 96:1:3 in N-methylpyrrolidone to prepare a positive electrode slurry. In this case, $Li_{1.143}[Ni_{0.33}Mn_{0.67}]_{0.857}O_2$ was used as the positive electrode active material and carbon nanotubes were used as the conductive agent.

The positive electrode slurry was coated on an aluminum current collector sheet, dried, and then rolled to manufacture a positive electrode having a loading amount of 4.30 mAh/cm$^2$.

<Manufacture of Negative Electrode>

A negative electrode active material, a conductive gent, a styrene-butadiene rubber (SBR), and carboxymethyl cellulose (CMC) were mixed in water in a weight ratio of 96.2:0.8:2:1 to prepare a negative electrode slurry. In this case, SiO and graphite (Gr) was mixed in a weight ratio of 5.5:94.5 and used as the negative electrode active material, and single-walled carbon nanotubes were used as the conductive agent.

The negative electrode slurry was coated on a copper current collector sheet, dried, and then rolled to manufacture a negative electrode having a loading amount of 4.95 mAh/cm$^2$.

<Manufacture of Lithium Secondary Battery>

A separator was disposed between the positive electrode and the negative electrode, which are manufactured as above, to prepare an electrode assembly, the electrode assembly was inserted in a battery case, and then an electrolyte solution was injected into the battery case to prepare a battery cell. Then, the battery cell was charged at 45° C. at a constant current of 0.1 C until the voltage reached 4.6 V, then discharged at a constant current of 0.1 C until 2.0 V, and a $Li_2MnO_3$ phase of the positive electrode active material was activated to manufacture a lithium secondary battery.

Example 2

A lithium secondary battery was manufactured in the same manner as in Example 1, except that the negative electrode had a loading amount of 4.52 mAh/cm² when the negative electrode was manufactured.

Example 3

A lithium secondary battery was manufactured in the same manner as in Example 1, except that $Li_{1.167}[Ni_{0.25}Mn_{0.75}]_{0.833}O_2$ coated with 1,500 ppm of Al was used as the positive electrode active material when the positive electrode was manufactured.

Example 4

A lithium secondary battery was manufactured in the same manner as in Example 1, except that the activation process was performed by charging the cell at 45° C. at a constant current of 0.1 C until the voltage reached 4.7 V and then discharging the cell at a constant current of 0.1 C until 2.0 V.

Examples 5-8

A lithium secondary battery was manufactured in the same manner as in Example 1, except that SiO and graphite were mixed in a weight ratio of 10:90 and used as the negative electrode active material when the negative electrode was manufactured, and a prelithiation process was further performed by an electrochemical method after the negative electrode was manufactured so that the negative electrode had a degree of prelithiation shown in Table 1 below.

Comparative Example 1

A lithium secondary battery was manufactured in the same manner as in Example 1, except that SiO and graphite were mixed in a weight ratio of 10:90 and used as the negative electrode active material when the negative electrode was manufactured.

Comparative Example 2

A lithium secondary battery was manufactured in the same manner as in Example 1, except that the negative electrode had a loading amount of 5.16 mAh/cm² when the negative electrode was manufactured.

Comparative Example 3

A lithium secondary battery was manufactured in the same manner as in Example 1, except that the prelithiation process was further performed by an electrochemical method after the negative electrode was manufactured so that the negative electrode had a degree of prelithiation shown in Table 1 below.

Comparative Example 4

A lithium secondary battery was manufactured in the same manner as in Example 1, except that the activation process was performed by charging the cell at 45° C. at a constant current of 0.1 C until the voltage reached 4.3 V and then discharging the cell at a constant current of 0.1 C until 2.0 V.

Comparative Example 5

A lithium secondary battery was manufactured in the same manner as in Example 1, except that $Li[Ni_{0.8}Co_{0.1}Mn_{0.1}]O_2$ was used as the positive electrode active material when the positive electrode was manufactured, and the activation process was performed by charging the cell at 45° C. at a constant current of 0.1 C until the voltage reached 4.2 V and then discharging the cell at a constant current of 0.1 C until 2.0 V.

TABLE 1

| | Positive electrode | | Negative electrode | | | |
|---|---|---|---|---|---|---|
| | Composition of positive electrode active material | Loading amount [mAh/cm²] | Weight ratio of SiOx:Gr | Loading amount [mAh/cm²] | Degree of prelithiation [%] | N/P ratio |
| Example 1 | $Li_{1.143}[Ni_{0.33}Mn_{0.67}]_{0.857}O_2$ | 4.3 | 5.5:94.5 | 4.95 | — | 115 |
| Example 2 | $Li_{1.143}[Ni_{0.33}Mn_{0.67}]_{0.857}O_2$ | 4.3 | 5.5:94.5 | 4.52 | — | 110 |
| Example 3 | $Li_{1.167}[Ni_{0.25}Mn_{0.75}]_{0.833}O_2$ coated with 1,500 ppm of Al | 4.3 | 5.5:94.5 | 4.95 | — | 115 |
| Example 4 | $Li_{1.143}[Ni_{0.33}Mn_{0.67}]_{0.857}O_2$ | 4.3 | 5.5:94.5 | 4.95 | — | 115 |
| Example 5 | $Li_{1.143}[Ni_{0.33}Mn_{0.67}]_{0.857}O_2$ | 4.3 | 10:90 | 4.95 | 3.74 | 115 |
| Example 6 | $Li_{1.143}[Ni_{0.33}Mn_{0.67}]_{0.857}O_2$ | 4.3 | 10:90 | 4.95 | 4.58 | 115 |
| Example 7 | $Li_{1.143}[Ni_{0.33}Mn_{0.67}]_{0.857}O_2$ | 4.3 | 10:90 | 4.95 | 5.86 | 115 |
| Example 8 | $Li_{1.143}[Ni_{0.33}Mn_{0.67}]_{0.857}O_2$ | 4.3 | 10:90 | 4.95 | 7.45 | 115 |
| Comparative Example 1 | $Li_{1.143}[Ni_{0.33}Mn_{0.67}]_{0.857}O_2$ | 4.3 | 10:90 | 4.95 | — | 115 |
| Comparative Example 2 | $Li_{1.143}[Ni_{0.33}Mn_{0.67}]_{0.857}O_2$ | 4.3 | 5.5:94.5 | 5.16 | — | 120 |
| Comparative Example 3 | $Li_{1.143}[Ni_{0.33}Mn_{0.67}]_{0.857}O_2$ | 4.3 | 5.5:94.5 | 4.95 | 3.03 | 115 |

TABLE 1-continued

|  | Positive electrode | | Negative electrode | | | |
| --- | --- | --- | --- | --- | --- | --- |
|  | Composition of positive electrode active material | Loading amount [mAh/cm$^2$] | Weight ratio of SiOx:Gr | Loading amount [mAh/cm$^2$] | Degree of prelithiation [%] | N/P ratio |
| Comparative Example 4 | Li$_{1.143}$[Ni$_{0.33}$Mn$_{0.67}$]$_{0.857}$O$_2$ | 4.3 | 5.5:94.5 | 4.95 | — | 115 |
| Comparative Example 5 | Li[Ni$_{0.8}$Co$_{0.1}$Mn$_{0.1}$]O$_2$ | 4.3 | 5.5:94.5 | 4.95 | — | 115 |

Experimental Example 1

After the lithium secondary batteries of Examples and Comparative Examples were fully discharged, the lithium secondary batteries were disassembled to separate the negative electrodes, and coin half-cells were manufactured using the separated negative electrodes and Li metal counter electrodes. The coin half-cells were delithiated at a constant current of 0.1 C to 1.0 V to measure a discharge capacity until fully discharged, and the discharge capacity was measured as the capacity of residual Li in the negative electrode.

Next, the coin half-cells were charged and discharged in a voltage range of 0.005 V to 1.0 V at 25° C. at 0.1 C to measure the discharge capacity of the negative electrode at 1 V, and the capacity resulting from SiOx in the negative electrode was measured using the measured discharge capacity of the negative electrode.

The measured value was substituted into Equation (1) below to calculate the depth of using SiOx at SOC 0%.

Depth of using SiOx=(capacity of residual Li in negative electrode/capacity of SiOx in negative electrode)×100     Equation (1):

Experimental Example 2: Number of Cycles of Reaching 80% Life

The secondary batteries manufactured in Examples and Comparative Examples were charged at 25° C. at a constant current of 0.33 C until the voltages reached 4.35 V, and discharged at a constant current of 0.33 C until 2.5 V as one cycle, and the charge and discharge were repeated, and the number of cycles that the discharge capacity after the cycle became 80% of the initial discharge capacity was measured. Measurement results are presented in Table 2 below.

Experimental Example 3: Energy Density (Unit: Wh/L)

The energy density per unit volume of the secondary batteries manufactured in Examples and Comparative Examples was measured in a voltage range of 4.35 V to 2.5 V. Measurement results are presented in Table 2 below.

TABLE 2

|  | Depth of using SiOx | Number of cycles of reaching 80% life | Energy density (Wh/L) |
| --- | --- | --- | --- |
| Example 1 | 3.36% | 580 | 470 |
| Example 2 | 10.00% | 604 | 475 |
| Example 3 | 10.50% | 532 | 467 |
| Example 4 | 11.93% | 510 | 465 |
| Example 5 | 3.36% | 561 | 493 |
| Example 6 | 6.00% | 573 | 491 |
| Example 7 | 10.00% | 599 | 488 |
| Example 8 | 15.00% | 620 | 485 |
| Comparative Example 1 | 0.00% | 327 | 472 |
| Comparative Example 2 | 0.40% | 491 | 466 |
| Comparative Example 3 | 18.80% | 500 | 460 |
| Comparative Example 4 | 0.00% | 450 | 303 |
| Comparative Example 5 | 0.00% | 382 | 427 |

As shown in Table 2 above, it may be confirmed that the batteries of Examples 1 to 8, in which the lithium-rich manganese-based oxide has been used as a positive electrode active material and the depth of using SiOx in a state of full discharge satisfies the scope of the present technology, have excellent life characteristics compared to the batteries of Comparative Examples 1 to 4, in which the depth of using SiOx deviates from the scope of the present disclosure. In addition, it may be confirmed that Comparative Example 5 in which NCM has been applied as a positive electrode active material rather than the lithium-rich manganese-based oxide has significantly lower life characteristics and energy density compared to the batteries of Examples.

The invention claimed is:

1. A lithium secondary battery comprising:

a negative electrode;

a positive electrode;

a separator disposed between the negative electrode and the positive electrode; and an electrolyte, wherein the negative electrode includes SiOx, where 0<x<2, and a carbon-based negative electrode active material, the positive electrode includes, as a positive electrode active material, a lithium-rich manganese-based oxide in which a manganese content in a total metal content except lithium is greater than 50 mol % and a ratio (Li/Me) of a number of moles of lithium to a total number of moles of metals except lithium is greater than 1, and a depth of using SiOx defined by Equation (1) below in a state of SOC 0% is 1 to 15:

Depth of using SiOx=(capacity of residual Li in negative electrode/capacity of SiOx in negative electrode)×100.     Equation (1).

2. The lithium secondary battery of claim 1, wherein the depth of using SiOx defined by Equation (1) above in a state of SOC 0% is 3 to 15.

3. The lithium secondary battery of claim 1, wherein the lithium-rich manganese-based oxide is represented by Formula 1 below:

$$Li_aNi_bCo_cMn_dM_eO_2 \qquad \text{[Formula 1]}$$

wherein, in Formula 1 above, $1<a$, $0\leq b\leq 0.5$, $0\leq c\leq 0.1$, $0.5\leq d\leq 1.0$, and $0\leq e\leq 0.2$ are satisfied, and M is at least one selected from the group consisting of Al, B, Co, W, Mg, V, Ti, Zn, Ga, In, Ru, Nb, Sn, Sr, and Zr.

4. The lithium secondary battery of claim 3, wherein, in the Formula 1 above, $1.1\leq a\leq 1.5$, $0.1\leq b\leq 0.4$, $0\leq c\leq 0.05$, $0.5\leq d\leq 0.80$, and $0\leq e\leq 0.1$ are satisfied.

5. The lithium secondary battery of claim 1, wherein the positive electrode active material has a $D_{50}$ of 2 μm to 10 μm.

6. The lithium secondary battery of claim 1, wherein the positive electrode active material has a BET specific surface area of 1-10 m²/g.

7. The lithium secondary battery of claim 1, wherein the positive electrode has an initial irreversible capacity of 5% to 70%.

8. The lithium secondary battery of claim 1, wherein the positive electrode has an electrode density of 2.5 g/cc to 3.8 g/cc.

9. The lithium secondary battery of claim 1, wherein the negative electrode includes the SiOx and the carbon-based negative electrode active material in a weight ratio of 1:99 to 50:50.

10. The lithium secondary battery of claim 1, wherein the negative electrode has a degree of prelithiation represented by Equation (2) below of 1% to 30%:

Degree of prelithiation (%)={capacity per unit area of Li intercalated into negative electrode by prelithiation/negative electrode loading amount}×100.    Equation (2).

11. The lithium secondary battery of claim 1, wherein the negative electrode further includes a conductive agent and a binder, and the conductive agent includes single-walled carbon nanotubes.

12. The lithium secondary battery of claim 1, wherein the SiOx has a $D_{50}$ of 3 μm to 8 μm.

13. The lithium secondary battery of claim 1, wherein the negative electrode includes a bottom negative electrode mixture layer formed on a negative electrode collector and a top negative electrode mixture layer formed on the bottom negative electrode mixture layer.

14. The lithium secondary battery of claim 1, wherein the SiOx is doped with $M^b$ metals, wherein the $M^b$ metals denote Group 1 alkali metal atoms and/or Group 2 alkaline earth metal atoms.

15. The lithium secondary battery of claim 1, wherein the lithium secondary battery has an N/P ratio of 100% to 150%.

16. The lithium secondary battery of claim 1, wherein the lithium secondary battery has a number of times of reaching 80% life of at least 510, and an energy density of at least 460 Wh/L.

17. The lithium secondary battery of claim 1, wherein the positive electrode active material further comprises a coating layer, and, the coating layer includes a coating element $M^1$ which is at least one selected from the group consisting of Al, B, Co, W, Mg, V, Ti, Zn, Ga, In, Ru, Nb, Sn, Sr, and Zr.

* * * * *